United States Patent Office 3,371,115
Patented Feb. 27, 1968

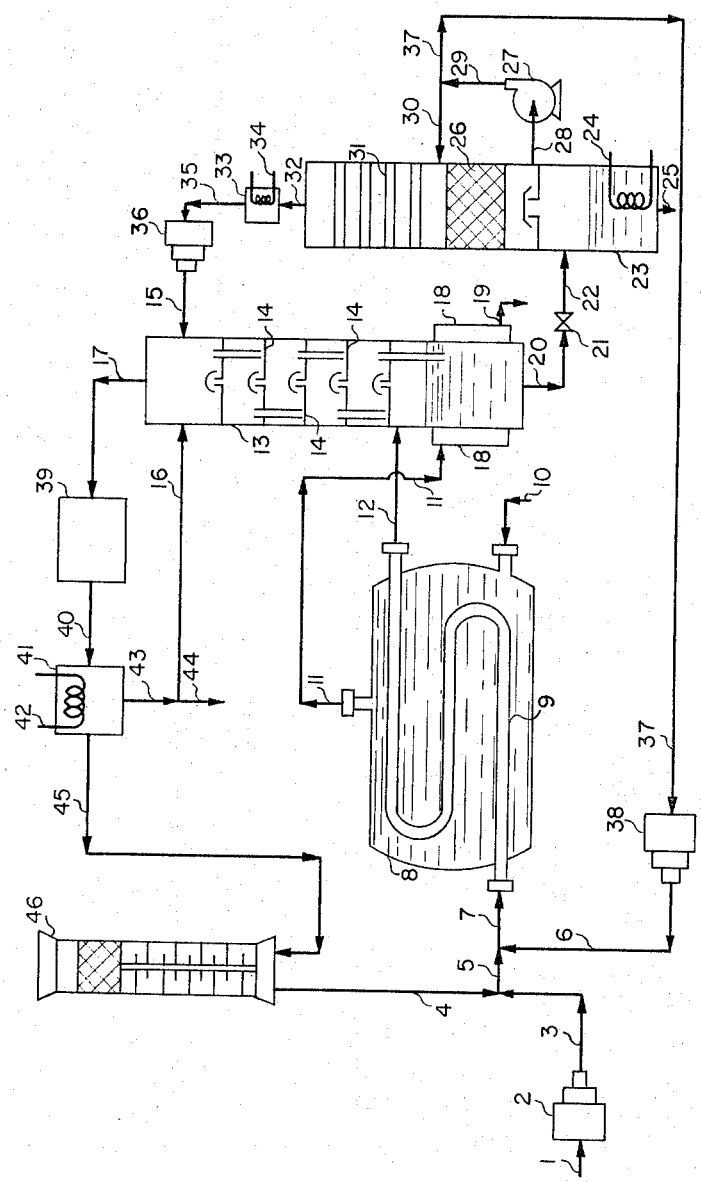

3,371,115
PROCESS FOR COMBINED PRODUCTION OF AMMONIA AND UREA
Lucien H. Cook, Port Washington, and Ivo Mavrovic, New York, N.Y., assignors to Chemical Construction Corporation, New York, N.Y., a corporation of Delaware
Filed Feb. 15, 1965, Ser. No. 432,728
8 Claims. (Cl. 260—555)

ABSTRACT OF THE DISCLOSURE

A combined process for the production of ammonia and urea is provided, in which crude ammonia synthesis gas derived from hydrocarbon reforming and principally containing hydrogen, nitrogen and carbon dioxide is reacted with ammonia synthesis effluent gas stream containing ammonia vapor, hydrogen and nitrogen. The reaction takes place under urea synthesis conditions, and recycled ammonium carbamate solution is added to the gaseous process streams being passed to urea synthesis. The combined effluent stream from urea synthesis is processesd to separate a gaseous phase containing hydrogen, nitrogen and ammonia vapor from a liquid phase containing urea, ammonium carbamate, ammonia and water. The gaseous phase is preferably cooled to condense product liquid ammonia, and the residual gas phase is passed to ammonia synthesis. The liquid phase is processed to separate product aqueous urea solution from recycle ammonium carbamate solution and ammonia vapor, which is condensed and recycled as reflux ammonia to the processing of the gaseous phase of the urea synthesis effluent stream.

This invention relates to the combined production of ammonia and urea from synthesis gas. A process is provided which accomplishes the reaction of input synthesis gas containing a substantial proportion of carbon dioxide with ammonia synthesis effluent gas and recycle aqueous ammonium carbamate solution. The resulting mixed process stream is reacted under urea synthesis conditions, and carbon dioxide is consumed in the formation of urea. The residual gas phase is then passed to ammonia synthesis, to form further ammonia synthesis effluent gas. A combined processing sequence is thus provided, which eliminates major processing steps and costs of the prior art.

Ammonia is synthetically produced by the catalytic combination of hydrogen and nitrogen at elevated pressure and temperature. The hydrogen is generally produced from hydrocarbons, by such well-known procedures as catalytic steam reforming or partial oxidation. A typical steam reforming process for the production of ammonia synthesis gas is described in U.S. Patent No. 2,829,113, and a partial oxidation procedure is described in U.S. Patent No. 3,022,148. In these procedures, a crude synthesis gas is produced which principally contains hydrogen, nitrogen, carbon monoxide and steam. The carbon monoxide is catalytically converted to carbon dioxide by reaction with steam, with concomitant production of further hydrogen, as described in U.S. Patents 2,829,113 and 3,010,807. Thus, a synthesis gas is produced which contains hydrogen and nitrogen in the required proportions for ammonia synthesis, together with carbon dioxide.

Carbon dioxide has generally been removed from the synthesis gas by scrubbing the gas stream with an absorbent solution containing an alkaline reagent, such as potassium carbonate or monoethanolamine. A procedure of this nature is described in U.S. Patent No. 2,886,405.

The absorbent solution containing dissolved carbon dioxide is regenerated by heating, generally at reduced pressure. Carbon dioxide is thus driven off as a separate gas stream. The resulting synthesis gas stream now containing principally hydrogen and nitrogen together with minor amounts of carbon monoxide, argon and methane, is passed to catalytic methanation or scrubbing with ammoniacal cuprous chloride solution to remove residual carbon monoxide. The final synthesis gas stream is now compressed and passed to high pressure catalytic ammonia synthesis, such as described in U.S. Patent No. 2,853,371.

In a typical urea synthesis procedure, liquid ammonia produced in a manner described supra is reacted at elevated urea synthesis pressure with compressed gaseous carbon dioxide. The carbon dioxide is generally available as a by-product stream from synthesis gas production, as described supra. The reactants initially combine to form ammonium carbamate in a highly exothermic reaction which readily goes to completion. The intermediate ammonium carbamate is then dehydrated to yield urea at elevated pressure. The final urea-forming reaction does not go to completion in practice, and thus a mixed process stream containing urea, water, ammonium carbamate and excess ammonia is generally produced in the urea synthesis autoclave. This mixed process stream is separated into product aqueous urea solution, aqueous ammonium carbamate solution and pure ammonia by established techniques, and the aqueous ammonium carbamate solution is recycled to the urea synthesis autoclave for further conversion to urea.

In the present invention, ammonia synthesis and urea synthesis are combined in a novel manner. In effect, the urea synthesis is employed to remove carbon dioxide from the crude ammonia synthesis gas mixture containing hydrogen, nitrogen and carbon dioxide. Thus, the synthesis gas mixture is compressed and combined with ammonia synthesis effluent gas containing a substantial proportion of ammonia, and the combined gas stream, mixed with recycle ammonium carbamate solution, is subjected to urea synthesis. As a result, the carbon dioxide originally in the synthesis gas mixture is converted to urea and ammonium carbamate, and a residual gaseous phase containing only hydrogen, nitrogen and ammonia vapor is separated from the liquid phase containing product urea. The residual gaseous phase is then passed to ammonia synthesis, while the liquid phase is separated into product aqueous urea solution, aqueous ammonium carbamate solution and excess ammonia. The ammonium carbamate solution is recycled to urea synthesis, while the excess amonia is recycled to provide ammonia reflux for purification of the residual gaseous phase, in a process sequence wherein residual carbon dioxide is condensed from the gaseous phase into the liquid solution as ammonium carbamate.

The process sequence of the present invention provides several outstanding advantages. The capital investment cost and plant utilities requirement of the ammonia synthesis facility are substantially reduced, since the prior art process step involving the scrubbing of the crude synthesis gas with alkaline absorbent reagent for carbon dioxide removal, followed by separate regeneration of the reagent, is completely eliminated. In addition, the hot ammonia synthesis effluent gas serves to preheat the incoming crude synthesis gas stream during mixing, and consequently substantial savings in heat exchange surfaces and heating costs are achieved. Finally, the conventional ammonia recovery units in prior art ammonia synthesis facilities, including the refrigeration section, ammonia cooled ammonia condenser, etc., are also eliminated since the ammonia is removed from the system as a component of the product urea.

It is an object of the present invention to produce ammonia and urea in a combined process.

Another object is to employ urea synthesis as a means of removing carbon dioxide from ammonia synthesis gas.

A further object is to provide an improved complete recycle process for urea production.

An additional object is to reduce the capital investment and operating utilities cost of an ammonia plant.

Still another object is to combine the synthesis of urea with the synthesis of ammonia.

These and other objects and advantages of the present invention will become evident from the description which follows. Referring to the figure, a crude synthesis gas stream 1 principally containing hydrogen, nitrogen and carbon dioxide is derived from the reforming of a hydrocarbon followed by catalytic CO-oxidation. As discussed supra, the hydrocarbon reform step, not shown, may consist either of catalytic steam reform or partial oxidation of a fluid hydrocarbon. Stream 1 is usually produced at a pressure below 600 p.s.i.g., and is compressed in compressor 2 to the required elevated pressure for urea and ammonia synthesis, generally in the range of 2500 p.s.i.g. to 6000 p.s.i.g. A preferred pressure range for the compressed gas stream 3 is from 4000 p.s.i.g. to 4500 p.s.i.g., since this pressure range is conventional for both urea and ammonia synthesis. If desired, a portion of the carbon dioxide content of streams 1 or 3 may be removed, as by a water scrub or scrub with aqueous potassium carbonate solution, not shown.

The compressed stream 3 is now combined with ammonia synthesis effluent stream 4, derived in a manner to be described infra. The combined gas stream 5 is further combined with recycle aqueous ammonium carbamate solution 6, and the combined process stream 7 is now passed to urea synthesis vessel 8. Unit 8 contains high pressure coil 9 through which the process stream passes in heat exchange with condensate water which is admitted via 10. The carbon dioxide originally contained in stream 3 combines with ammonia from stream 4 to form ammonium carbamate while the process stream passes through coil 9. This exothermic reaction generates heat, and the process stream inside coil 9 is cooled and maintained at a temperature typically in the range of 150° C. to 200° C. by heat exchange with the liquid water in vessel 8. The liquid water is vaporized and generated steam is removed via 11, generally at a pressure in the range of 40 p.s.i.g. to 170 p.s.i.g. A portion of the ammonium carbamate is further converted to urea while the process stream passes through coil 9.

The process stream is removed from coil 9 via 12, and is a gas-liquid mixture principally containing urea, ammonium carbamate, ammonia, water, hydrogen and nitrogen. Stream 12 now passes to high pressure gas-liquid separator 13, in which the process stream is divided into a gaseous phase free of carbon dioxide and consisting of hydrogen, nitrogen and ammonia, and a liquid phase principally containing urea, water, ammonium carbamate and dissolved free ammonia. Unit 13 is provided with an upper reflux section consisting of a plurality of bubble cap trays 14 with downcomers. A temperature gradient is maintained in the upper reflux section by means of cold liquid ammonia which is passed in above the top tray via 15 and 16. The top tray temperature is generally maintained below 130° to avoid the ammonia critical point at the elevated operating pressure. Due to the temperature gradient and reflux ammonia, any carbon dioxide originally present in the gaseous phase is converted to liquid ammonium carbamate and passed downwards through unit 13. A purified gaseous phase free of carbon dioxide and consisting of hydrogen, nitrogen and ammonia is removed via 17 from unit 13.

Returning to the lower portion of unit 13, the liquid phase passes downwards and is heated by steam jacket 18, which is preferably provided with steam via 11. Condensate water is removed via 19 from jacket 18, and is preferably recycled via 10. It will be appreciated that a condensate water pump and steam pressure control valve will be provided in the water-steam circuit in practice. As the liquid phase is heated in passing downward through the lower portion of unit 13, further conversion of ammonium carbamate to urea takes place. The resulting liquid stream 20 containing product urea is removed from unit 13 at high pressure, and passed through pressure reducing valve 21. The resulting stream 22, now typically at a pressure below about 400 p.s.i.g., is passed into purification means 23. Unit 23 is shown schematically as a single vessel, however, as will appear from U.S. Patents 3,155,722 and 3,155,723, the function and operation of unit 23 may take place in a plurality of vessels and process steps, at two distinct pressure levels. Thus unit 23 is only shown schematically to indicate its function in this preferred embodiment of the invention.

Stream 22 is heated by heating means 24 in unit 23, whereby ammonium carbamate decomposition and generation of a mixed ammonia-carbon dioxide off-gas takes place. As indicated supra, this process step may actually take place in a plurality of stages, as described in the cited patents. The residual liquid phase is drawn off via 25 as an aqueous urea product solution. The rising off-gas stream passes through packed section 26 in unit 23, and is scrubbed and partially condensed by circulating aqueous ammonium carbamate solution which is drawn off via 28, discharged through pump 27 via 29 and partially recycled above the packed section 26 via 30 after cooling, not shown. The residual off-gas stream, now principally consisting of ammonia, is further purified in upper reflux section 31 of vessel 23, and finally an ammonia gas stream free of carbon dioxide is withdrawn via 32. Details of this purification process and apparatus are contained in the U.S. patents cited supra. The ammonia vapor is condensed to liquid in cooler 33 provided with cooling means 34, which may include refrigeration, not shown. Pure liquid ammonia is withdrawn from condenser 33 via 35, preferably at a temperature below 130° C., and is compressed in unit 36 to a pressure in the range of 2500 p.s.i.g. to 6000 p.s.i.g. and recycled via 15 to unit 13.

Returning now to the aqueous ammonium carbamate scrubbing stage in unit 23, only part of withdrawn stream 28 is returned to the vessel via 30. Pump discharge stream 29 is split, with the balance of stream 29 passing via 37 to recycle compressor 38. The aqueous ammonium carbamate solution is compressed to urea synthesis pressure between about 2500 p.s.i.g. to 6000 p.s.i.g. in compressor 38 and recycled via 6 to the urea synthesis.

Referring now to off-gas stream 17 derived from unit 13 and containing hydrogen, nitrogen and ammonia, stream 17 is passed first through circulating blower 39 which compensates for pressure drop in the circulating gas phase. The discharged gas stream 40 now passes to cooler 41, provided with cooling or refrigeration means 42, in which at least a portion of the ammonia content of the gas stream is condensed to liquid ammonia. The liquid ammonia is withdrawn via 43, and may be partially recycled to unit 13 via 16 to provide ammonia reflux. The balance of stream 43 forms product ammonia stream 44.

The remaining gaseous phase is withdrawn from cooler 41 via 45, and passed to catalytic ammonia converter 46. Ammonia is synthesized from hydrogen and nitrogen in unit 46, which is shown only in schematic outline. Actual details of a typical unit are presented in U. S. Patent No. 2,853,371. The effluent stream 4 derived from unit 46, consisting of ammonia together with unconverted hydrogen and nitrogen, is now passed to the urea synthesis unit as described supra.

Various alternatives within the scope of the present invention will occur to those skilled in the art. Thus, depending on the temperature levels in unit 13, in some cases stream 15 will be of sufficient magnitude to provide adequate reflux ammonia for complete carbon dioxide condensation, and stream 16 may be omitted. It is feasible with highly elevated pressure and lower temperature in unit 13 to remove a major portion of the ammonia contained in stream 12 via liquid phase 20. In this case, a portion of stream 35 would be withdrawn as ammonia product, and thus the processing of unit 41 could be omitted. Lower temperatures in unit 13 may be achieved by providing cooling coils on bubble cap trays 14. It is also feasible to recycle a small portion of stream 37 to unit 13 between trays 14, in order to aid in washing carbon dioxide from the rising gas mixture as ammonium carbamate in aqueous solution. Other processing alternatives within the scope of the present invention will readily occur to those skilled in the art. Although stream 1 is preferably produced by catalytic steam reforming of a fluid hydrocarbon, solid carbonaceous fuels such as coal or coke may also be employed as raw material for the production of a crude synthesis gas, employing well-known procedures such as the water gas reaction with steam or partial oxidation.

An example of the industrial application of the process of the present invention will now be described. In the example infra, all flow stream compositions are expressed in pounds per hour, unless otherwise stated.

EXAMPLE

Ammonia synthesis was combined with the synthesis of 150 tons/day of urea at 4000 p.s.i.g. A small amount of net ammonia product was also produced for external usage. Following is a tabulation of input and output streams, together with principal recycle streams in the ammonia synthesis loop.

STREAM COMPOSITION, POUNDS PER HOUR

| Stream No. | Ammonia | Hydrogen | Nitrogen | Carbon Dioxide | Urea | Water |
|---|---|---|---|---|---|---|
| 3 | | 1,476 | 6,940 | | | |
| 4 | 9,440 | 4,452 | 20,780 | 10,100 | | |
| 25 | | | | | | |
| 44 | 595 | | | | 13,750 | 4,140 |
| 16 | 9,500 | | | | | |
| 45 | 1,020 | | | | | |
| 15 | 5,010 | 5,940 | 27,700 | | | |
| 37 | 5,950 | | | 5,590 | | 3,330 |

Stream 11 consisted of 150 p.s.i.g. steam. The addition of stream 16 at a temperature of 32° F. to unit 13 served to maintain the top section of unit 13 at a temperature of 260° F.

In accordance with the process of the present invention as outlined supra, a 200 short tons per day ammonia plant was tied to the production of 333 short tons of urea. Operating under the system of the present invention, significant equipment units previously required were eliminated. These included the secondary CO converter, methanator heat exchanger, methanator, methanator preheater, secondary heat exchanger, secondary preheater, final gas cooler, entire carbon dioxide removal section, refrigeration section, cold exchanger, the ammonia cooled condensers, product ammonia letdown tank, and the secondary separator. The primary separator and water cooled condenser were not omitted, because a condenser and separator are needed to take out the recycle and product ammonia. Substantial structural items corresponding to the eliminated equipment units were also no longer required. These included foundations, structural steel, insulation, piping, instrumentation, secondary CO converter catalyst and methanator catalyst.

After including all other job costs and by proration an estimated savings of $1,060,000 was obtained in relation to the 200 tons per day ammonia plant. With respect to operating utilities, the ammonia plant was credited with the steam produced, which steam can be used in the operation of the urea plant. A credit was taken for the savings in the consumption of cooling water and electric power. A credit in production cost was also taken in relation to the savings in capital investment, maintenance and labor. On the basis of such operation, the ammonia production cost was reduced by $8.23 per short ton. Approximately 0.6 short ton of ammonia per short ton of urea produced would automatically reduce the urea production costs by $4.94 per short ton.

With respect to the economics of urea production, the only change in the urea plant equipment is the substitution of the tubular urea reactor and separator for the conventional reactor. The additional cost for the high pressure separator would be met by the savings in connection with the deletion of the ammonia pumping capacity related to feed ammonia plus the saving on the gas compressor because carbon dioxide compression would be combined with the mixed gas compressor. The steam produced in the urea reactor would save the cost of about one third of the steam requirements for the urea plant. This will further reduce the cost of urea production. Whereas normally the base production cost of bagged urea is about $40.00 a short ton, as a result of the economics discussed supra this would be reduced to about $34.50 per short ton of bagged urea.

We claim:

1. Process for combined production of ammonia and urea which comprises reforming a carbon-containing material to produce a crude reformed gas mixture principally containing hydrogen, nitrogen, carbon monoxide and steam, catalytically reacting said carbon monoxide with steam to produce further hydrogen and carbon dioxide, thereby forming a final reformed gas mixture principally containing hydrogen, nitrogen and carbon dioxide, compressing said final reformed gas mixture to urea synthesis pressure, combining the compressed gas mixture with ammonia synthesis effluent gas stream containing ammonia, hydrogen and nitrogen, and with recycle aqueous ammonium carbamate solution, reacting the combined process stream at urea synthesis pressure whereby the carbon dioxide content of the combined stream is reacted with ammonia to form urea, separating a mixed gas stream comprising hydrogen, nitrogen and residual ammonia and recycle aqueous ammonium carbamate solution from product aqueous urea solution, and catalytically reacting the mixed gas stream under ammonia synthesis conditions whereby said ammonia synthesis effluent gas stream is produced.

2. Process for combined production of ammonia and urea which comprises reforming a hydrocarbon to produce a crude reformed gas mixture principally containing hydrogen, nitrogen, carbon monoxide and steam, catalytically reacting said carbon monoxide with steam to produce further hydrogen and carbon dioxide, thereby forming a final reformed gas mixture principally containing hydrogen, nitrogen and carbon dioxide, compressing said final reformed gas mixture to urea synthesis pressure, combining the compressed gas mixture with ammonia synthesis effluent gas stream containing ammonia, hydrogen and nitrogen and with recycle aqueous ammonium carbamate solution, reacting the combined process stream at urea synthesis pressure whereby carbon dioxide is combined with ammonia to form ammonium carbamate and a portion of said ammonium carbamate is dehydrated to produce urea, separating the resulting stream into gaseous and liquid phases, cooling and refluxing the gaseous phase with recycle liquid ammonia at urea synthesis pressure whereby carbon dioxide is removed from the residual gaseous phase, combining the resulting liquid solution with said liquid phase to form a combined liquid stream, heating said combined liquid stream to form further urea, separating the combined liquid stream at reduced pressure into product aqueous urea solution, recycle aqueous ammonium carbamate solution and recycle ammonia, and recycling said residual gaseous phase comprising hydrogen, nitrogen and ammonia vapor to catalytic ammonia synthesis, whereby said ammonia synthesis effluent gas stream is produced.

3. Process of claim 2, in which the combined process stream formed by mixture of compressed reformed gas with ammonia synthesis effluent gas stream and recycle ammonium carbamate solution is reacted at urea synthesis pressure while in indirect heat exchange relationship with water, whereby said combined process stream is cooled and steam is generated.

4. Process of claim 3, in which said steam is passed in indirect heat exchange relationship with said combined liquid stream formed by combining said resulting liquid solution with said liquid phase, whereby said steam is condensed and said combined liquid stream is heated.

5. Process of claim 2, in which said residual gaseous phase comprising hydrogen, nitrogen and ammonia vapor is cooled prior to recycle of the gaseous phase to ammonia synthesis, whereby a portion of the contained ammonia vapor is condensed to liquid ammonia and separated from the gaseous phase.

6. Process of claim 5, in which said condensed liquid ammonia is at least partially recycled to scrub said gaseous phase and remove residual carbon dioxide.

7. Process for combined production of ammonia and urea which comprises reforming a fluid hydrocarbon with steam and air at a pressure below 600 p.s.i.g. to produce a crude reformed gas mixture principally containing hydrogen, nitrogen, carbon monoxide and steam, catalytically reacting said carbon monoxide with steam to produce further hydrogen and carbon dioxide, thereby forming a final reformed gas mixture principally containing hydrogen, nitrogen and carbon dioxide, compressing said final reformed gas mixture to urea synthesis pressure in the range of 2500 p.s.i.g. to 6000 p.s.i.g., combining the compressed gas mixture with ammonia synthesis effluent gas stream containing ammonia, hydrogen and nitrogen and with recycle aqueous ammonium carbamate solution, reacting the combined process stream at urea synthesis pressure in the range of 2500 p.s.i.g. to 6000 p.s.i.g. and temperature in the range of 150° C. to 200° C. while in indirect heat exchange relationship with liquid water, whereby carbon dioxide in the gas stream is combined with ammonia to form ammonium carbamate and a portion of said ammonium carbamate is dehydrated to produce urea, said liquid water being vaporized to form steam at a pressure in the range of 40 p.s.i.g. to 170 p.s.i.g., separating the resulting stream into gaseous and liquid phases, cooling and refluxing the gaseous phase with recycle liquid ammonia, said liquid ammonia being at a temperature below 130° C., whereby carbon dioxide is removed from the residual gaseous phase, combining the resulting liquid solution with said liquid phase, heating the combined liquid stream by indirect heat exchange with said steam whereby further urea is formed in the combined liquid stream, separating the combined liquid stream into product aqueous urea solution, recycle aqueous ammonium carbamate solution and recycle ammonia at a pressure reduced to below 400 p.s.i.g., and recycling said residual gaseous phase comprising hydrogen, nitrogen and ammonia vapor to catalytic ammonia synthesis, whereby said ammonia synthesis effluent gas stream is produced.

8. Process of claim 7, in which the pressure during said urea synthesis and said ammonia synthesis is in the range of 4000 p.s.i.g. to 4500 p.s.i.g.

References Cited

UNITED STATES PATENTS

| | | | |
|---|---|---|---|
| 3,303,215 | 2/1967 | Otsuka et al. | 260—555 |
| 3,310,376 | 3/1967 | Cook et al. | 23—190 |

HENRY R. JILES, *Primary Examiner.*